United States Patent Office 3,769,399
Patented Oct. 30, 1973

3,769,399
INTESTINAL BILE ACID BINDING PROCESS
AND COMPOSITIONS
Larry Melvin Hagerman, 1912 E. Mulberry St. 47714, and Donald Louis Schneider, R.R. 5, Box 4 46011, both of Evansville, Ind.
No Drawing. Continuation-in-part of abandoned application Ser. No. 761,115, Sept. 20, 1968. This application Mar. 5, 1971, Ser. No. 121,588
Int. Cl. A61k 27/00
U.S. Cl. 424—79
14 Claims

ABSTRACT OF THE DISCLOSURE

The systemic administration of from about 89 mg. to 837 mg. of taurine per kg. of body weight per day to an animal of a species having the inherent capacity to secrete in the bile taurine conjugated bile acids substantially improves the intestinal binding of bile acids by a bile-acid binding anion exchange resin such as cholestyramine.

CROSS REFERENCE TO RELATED APPLICATION

This application is a continuation-in-part of our earlier filed copending application Ser. No. 761,115 filed Sept. 20, 1968 now abandoned.

FIELD OF THE INVENTION

This invention provides an improved drug composition and body treating process involving the oral administration of a basic anion exchange resin to a mammal in combination with oral administration of taurine or a pharmaceutically acceptable salt thereof. A beneficial increase in intestinal binding of bile acids occurs.

DESCRIPTION OF THE PRIOR ART

The ingestion of basic anion exchange resins having an affinity for bile acids has been shown to bind bile acids in the intestinal tract resulting in increased fecal excretion of the bile acids. This has two very important effects namely the reduction of blood cholesterol concentrations and the relief of pruritis in patients having bile stasis. Refer to D. M. Tennent et al. J. Lipid Research, vol. 1, page 469 (1960), where experimental work describing the anti-cholesterol effect in cockerels and dogs of feeding a water soluble polyacrylic quaternary ammonium anion exchange resin referred to as MK 325 and of a water insoluble styrene divinylbenzene quaternary ammonium anion exchange resin referred to as MK 135. The former is also referred to in U.S. Pat. 3,308,020 and the latter in U.S. Pat. 3,383,281. MK 135 is now referred to commercially as cholestyramine.

Various cellulose and dextran anion exchangers such as diethylaminoethyl cellulose, guanidinoethyl cellulose, and diethylaminoethyl dextran also have serum cholesterol lowering effects on ingestion by animals (Parkinson, J. Lipid Research 8, 24–29 (1967)). A polymer of the polyethylenimine type referred to in the literature as colestipol or U–26597A has also been employed for intestinal bile acid binding. Refer to Parkinson et al., Circulation, Supplement III October 1969, page 19; and J. Amer. Med. Assoc., 209, 926 (Aug. 11, 1969). Colestipol is characterized as a tetraethylenepentamine polymer with 1-chloro-2,3-epoxy-propane.

Taurine has been reported to reduce blood cholesterol concentration in animals under specific dietary conditions, but its effect in man has not been established. Refer to R. G. Hermann, Circulation Research 7, 224–227 (1959); G. V. Mann, Journal of Clinical Nutrition 8, 491–498 (1960); French Pat. No. 5955M of J. Rambaud and J. C. Denis (Tecepan S.A.) Nov. 8, 1966; Truswell et al., J. Athero. Res. 5, 526 (1965); and to Lieber, Semana Med. 126:25:962 (1965). There has been no suggestion previously, nor is it suggested now that taurine of itself binds bile acids in the intestinal tract or is of any value whatever in the treatment of pruritis of bile stasis.

SUMMARY OF THE INVENTION

The primary object of the present invention is to improve the effectiveness of intestinal binding and excretion of bile acids by ingested anion exchange resins of the foregoing type. The invention involves the finding that this object can be achieved if the resin regimen is supplemented by the concomitant administration of the amino sulfonic acid taurine or a pharmaceutically acceptable salt thereof. Salts of the latter type are non-toxic in the doses involved and have a physical character suiting them for pharmaceutical use. Such salts are known to the art and include the sodium, potassium, calcium and magnesium salts, and the ammonium and various amine salts with for example triethylamine, ethanolamine, morpholine, triethanolamine etc.

The present invention involves the oral or parenteral administration of taurine or one of its non-toxic salts concomitantly with oral administration of a bile acid binding anion exchange resin in the treatment of an animal which has the capacity to secrete taurine conjugated bile acids. We have observed that taurine conjugated bile acids have several fold the affinity for the bile acid binding anion exchange resins than the glycine conjugated bile acids. Although we do not wish to be bound by any theory as to the mechanism by which the present invention operates, it is believed that increased metabolic availability of taurine results in increased secretion of taurine conjugated bile acids which, in turn, are more efficiently bound by the resin, resulting in increased excretion thereof in the feces and concomitant depletion of cholesterol reservoirs through bile acid replacement synthesis by the liver.

The bile acids of various animal species differ in composition as to their content of glycine conjugated bile acids and taurine conjugated bile acids. The dog and the chicken secrete exclusively taurine conjugated bile acids, the rabbit exclusively glycine conjugated bile acids, the rat and mouse chiefly taurine conjugates and the young guinea pig, swine and man secrete both types, but primarily glycine conjugates. The present invention is applicable to each of the foregoing animal species except the rabbit and to any other species which has the inherent capacity to secrete taurine conjugated bile acids.

Generically speaking two classes of resin are operative in the present invention. One includes the water insoluble resins of the type defined in the Wolf patent U.S. 3,383,281 referred to above. These resins are characterized by having a relatively high molecular weight in excess of 3,000; the ability to bind at least 30% of the available glycocholic acid within 5 min. when exposed to an aqueous solution of an equal weight of said acid; a polymer skeleton which is inert to digestive enzymes; and having a water content greater than 65% after equilibration with air at 100% relative humidity.

The second class of resins contemplated for the present invention have a polysaccharide polymer skeleton of cellulose or dextran chemically modified by the introduction of amino or quaternary ammonium groups. These resins have a glycocholic acid absorption capacity in accordance with the critereon quoted above from the Wolf patent. They are resistant to the digestive enzymes of monogastric or nonruminant animals, they are substantially nontoxic, and they have molecular weights of at least 3000, but they do not necessarily have the hygroscopic nature observed by Wolf. A number of resins of this type are described in the first Parkinson article cited above in the Description of the Prior art.

Preferred resins of the type referred to in the Wolf patent are the water insoluble non-absorbable strong base quaternary ammonium polystyrene divinylbenzene cross-linked anion exchange resins having up to 5% cross-linking. The quaternary ammonium groups are introduced into the polystyrene divinylbenzene resin skeleton by chloromethylation followed by reaction of the chloromethyl groups with a tertiary amine. Where the tertiary amine is trimethylamine the resins are referred to in the art as Type I resin. The Type II resins are similar but the quaternizing amine is dimethylethanolamine. The polystyrene divinylbenzene Type I resins having 2% cross-linking are most preferred. Typical commercially available Type I resins are Dowex 1 x 1, Dowex 1 x 2, Dowex 1 x 4 of the Dow Chemical Company, Midland, Mich., and Amberlite XE–268, XE–269, IRA–400, and IRA–401 of Rohm and Haas of Philadelphia, Pa. They are used in the form of non-toxic salts such as the chloride, sulfate, acetate, and phosphate, or in the hydroxide form. Specific Type I resins having 2% cross-linking which are preferred and commercially available as cholestyramine, Dowex 1 x 2, and Amberlite XE–269.

Another group of resins meeting the criteria of the Wolf patent and therefore operable according to the present invention are the tetraethylenepentamine polymers with 1-chloro-2,3-epoxypropane (epichlorohydrin). A specific resin of this group is colestipol or U 26597A. It is a high molecular weight insoluble tetraethylenepentamine epichlorohydrin co-polymer having a bile acid binding capacity in vitro of approximately 1 meq. cholate/g.

Suitable resins having cellulose or dextran polymer skeletons include guanidoethyl cellulose, diethylaminoethyl dextran, and diethylaminoethyl cellulose. The preferred resin of this group is diethylaminoethyl dextran produced by Pharmacia, Uppsula, Sweden, and sold in the United States by Pharmacia Fine Chemicals, Inc., Piscataway, N.J. It is obtained by the introduction of diethylaminoethyl substituents into a cross-linked dextran. Dextran is a polysaccharide based upon glucose. DEAE-Sephadex A–25 is cross-linked to an extent where it has the capacity to absorb only molecules having molecular weights of less than about 10,000. When placed in water it swells to form a gel which is insoluble in water and in salt solutions. It has an adsorption capacity of about 3 to 4 meq./g.

According to our invention, taurine or its pharmaceutically acceptable salt is systemically administered by any convenient route, orally or parenterally, in doses ranging from about 89 mg. to 837 mg./kg. of body weight of the animal being treated concomitantly with the resin. Oral administration is preferred. Taurine has no known toxicity, doses of 15 g. per day orally having been administered to a man without ill effect. Under the normal physiologic conditions of the intestinal tract, taurine is not adsorbed to the resin and accordingly it may be administered in compositions with the resin or separately. The former is, perhaps, the most convenient method. However, the time relationship of administration of the taurine with respect to administration of the resin is not critical on a long term basis. It is preferred that the taurine be administered on a three or four times a day basis within the foregoing dosage range. No specific time relationship of administration is intended when we state that taurine is administered concomitantly with the resin. Either simultaneous administration as with a unitary dosage form or separate administration during the period of resin therapy is meant.

In man the minimum recommended dose of resin is about 8 g. The upper limit of tolerability of the resin in man varies with the individual. Occasionally at doses in excess of 24 g. constipation and malabsorption of fats occurs. In other animal species higher doses may be employed. Doses equivalent to a daily dose of 57.2 g. in man may be employed.

In view of the lack of toxicity of taurine, the upper dosage limit according to the present invention is related to the function observed, it being preferred not to administer an excess of taurine over that which gives the near maximal resin potentiating effect. This can be readily ascertained by administering various doses of taurine with a fixed dose of resin and measuring the bile acids excreted in the feces, or by measuring the resultant reduction in blood cholesterol concentration. When a further increased incremental dose of taurine of about 15% higher than the sequentially lower dose tested affords no further increase in bile acid excretion, it can be assumed that the maximal functionally effective dose has been reached.

Again in view of the lack of toxicity of taurine and its pharmaceutically acceptable salts, it is not essential to determine the minimal effective dose, particularly since one is not interested in exerting only the smallest statistically significant increase in bile acid excretion. The minimum dose for practical reasons is of the order of 89 mg./kg. The following are composition formulations useful in the invention.

FORMULATION 1

|  | G. |
|---|---|
| Cholestyramine resin | 70 |
| Spray-dried acacia gum | 20 |
| Sodium alginate | 4 |
| Orange flavor, gum base | 6 |
| Taurine | 40 |

The foregoing formulation when administered to an adult human at the rate of three 8 g. proportions per day provides approximately 12 g. of resin and 7 g. of taurine. It is preferred to use the resin in finely divided form such that at least 90% thereof passes through a 200 mesh sieve.

FORMULATION 2

|  | Mg. |
|---|---|
| Colestipol resin | 500 |
| Magnesium stearate | 5.0 |
| Taurine | 250 |

These materials are mixed and filled into hard gelatin capsules. Thirty such capsules provides 15 g. of resin and 7.5 g. of taurine.

FORMULATION 3

|  | G. |
|---|---|
| Amberlite XE–269 | 59 |
| Spray dried acacia gum | 9 |
| Sodium alginate | 3 |
| Sodium taurinate | 103 |
| Sucrose | 32 |
| Flavors and colors | 12 |

Three 19.6 g. doses of Formulation 3 per day provides 16 g. of resin and the equivalent of 15 g. taurine.

Example 1. Fecal bile acid excretion in the rats; various resins with taurine.—A 20% casein-10% corn oil basal diet having the following composition was fed for a pre-test period of 7 days to 150 male weaning rats which were arranged into 15 groups of 10 animals each such that the total group body weights were approximately the same.

|  | Per 100 g. diet |
|---|---|
| Casein _____g__ | 20 |
| Modified corn starch _____g__ | 61.6 |
| Corn oil _____g__ | 10.0 |
| Non-nutritive fiber _____g__ | 4.0 |
| Mineral mixture (Jones and Foster, J. Nutrition 24, 243 (1942), with 10 p.p.m. fluoride as sodium fluoride added) _____g__ | 4.0 |
| Vitamin mixture (Sarett and Snipper, J. Nutrition 52, 525 (1954), with ascorbic acid omitted) _g__ | 0.35 |
| Vitamin E (33% dry acetate) _____g__ | 0.015 |
| Vitamin A _____units__ | 825 |
| Vitamin D _____do____ | 118 |

In this experiment, the animals of Group 1 were continued on the basal diet throughout the test period as a control group. Groups 2 and 3 received 0.5% and 1% by weight of taurine respectively mixed with the diet. The remaining animals received one of the experimental resins mixed with the diet in the amount of 1% by weight either alone or in combination with 0.5 or 1.0% by weight of taurine according to the schedule shown in Table I. A 2 week test period was employed.

TABLE I.—VARIOUS RESINS
Dietary schedule according to group number

| Resin | Percent taurine in diet | | |
|---|---|---|---|
| | 0 | 0.5 | 1.0 |
| | Group number | | |
| None | 1 | 2 | 3 |
| Cholestyramine | 4 | 5 | 6 |
| DEAE-Sephadex A-25 | 7 | 8 | 9 |
| Colestipol | 10 | 11 | 12 |
| Amberlite XE-269 | 13 | 14 | 15 |

The feces from all rats were collected by group during the second week of the test period and assayed for bile acid content by the method of Turnberg, et al., Clinica Chimica Acta. 24, 253 (1969). For statistical evaluation of these data, 2 x 2 factorial analysis of the results for each group receiving both resin and taurine versus the results for the corresponding control groups receiving neither or resin or taurine alone was employed. Significant interactions signifying greater than additive effect on fecal bile acid excretion were observed as summarized in Table II.

TABLE II.—VARIOUS ERSINS
Fecal bile acid excretions

| Group No. | Dietary treatment (percent) | | Fecal bile acids (micromoles/ 100 g. body weight/day) |
|---|---|---|---|
| | Resin | Taurine | |
| 1 | None | None | 6.1 |
| 2 | do | 0.5 | 6.6 |
| 3 | do | 1.0 | 8.5 |
| 4 | Cholestyramine, 1.0 | None | 33 |
| 6 | do | 1.0 | 53 |
| 7 | DEAE-Sephadex A-25, 1.0 | None | 23 |
| 9 | do | 1.0 | 36 |
| 10 | Colestipol, 1.0 | None | 25 |
| 12 | do | 1.0 | 35 |
| 13 | Amberlite XE-269, 1.0 | None | 36 |
| 14 | do | 0.5 | 51 |

Example 2. Fecal bile acid excretion in the rat; sodium taurinate.—Four groups of 10 rats each were selected and fed the diet described in Example 1 containing 1% by weight of cholestyramine. The diet of one group was further supplemented with 0.6% by weight of the sodium salt of taurine. The diet of another group was supplemented with 1.2% by weight of sodium taurinate. These amounts of sodium taurinate in the diet correspond on a molar basis to 0.5% and 1.0% by weight of taurine. The experiment covered a 2 week feeding period and feces were collected and analyzed as in Example 1. The results are shown in Table III.

TABLE III.—FECAL BILE ACID EXCRETION
Cholestyramine and sodium taurinate

| Resin treatment | Percent sodium taurinate | Fecal bile acids (micromoles/ 100 g. body weight/day) |
|---|---|---|
| None | 0.6 | 7.1 |
| Do | 1.2 | 8.8 |
| Cholestyramine, 1% | 0.6 | 48 |
| Do | 1.2 | 48 |
| Do.[1] | None | 33 |

[1] Group 4 of Example 2.

Example 3. Fecal bile acid excretion in the rat; graded doses of resin and taurine. After being fed the 20% casein-10% corn oil basal diet referred to in Example 1 for a pre-test period of 14 days. 200 male weanling rats were arranged into 20 groups of 10 animals each numbered 16 through 35, such that the total group body weights were approximately the same. During the 2 week test period which followed, Group 16 was maintained on the basal diet as control and the others received diets supplemented with either taurine or cholestyramine or both according to the following schedule.

TABLE IV.—VARIOUS DOSES OF CHOLESTYRAMINE AND TAURINE; DIETARY SCHEDULE ACCORDING TO GROUP NUMBER

| Percent taurine in diet | 0 | 0.035 | 0.35 | 1.05 |
|---|---|---|---|---|
| Percent chloestyramine in diet: | | | | |
| 0 | 16 | 17 | 18 | 19 |
| 0.07 | 20 | 21 | 22 | 23 |
| 0.56 | 24 | 25 | 26 | 27 |
| 1.12 | 28 | 29 | 30 | 31 |
| 1.68 | 32 | 33 | 34 | 35 |

The feces from each group were collected during the second week of the test and assayed for bile acid content as described in Example 1. In all instances the fecal bile acid output of the resin treated groups was significantly greater than the corresponding group receiving taurine and no resin at all levels of taurine treatment. Again statistical evaluation of the results by 2 x 2 factorial analysis of bile acid excretion values for each group receiving resin and taurine versus the corresponding control groups receiving neither resin nor taurine or just one of them was conducted. Bile acid excretions in excess of the values expected by adding the results from the individual treatments were obtained for those animals receiving 0.56, 1.12, 1.68% by weight of cholestyramine in the diet along with 1% of taurine. The results are arranged in Table V.

TABLE V.—FECAL BILE ACID EXCRETIONS; VARIOUS DOSES OF CHOLESTYRAMINE

| Group No. | Dietary treatment (percent) | | Fecal bile acids (micromoles/100 g. body weight/ day) |
|---|---|---|---|
| | Cholestyramine | Taurine | |
| 16 | None | None | 5.9 |
| 19 | None | 1.0 | 7.9 |
| 24 | 0.56 | None | 21 |
| 27 | 0.56 | 1.0 | 29 |
| 28 | 1.12 | None | 35 |
| 31 | 1.12 | 1.0 | 45 |
| 32 | 1.68 | None | 40 |
| 35 | 1.68 | 1.0 | 57 |

Example 4. Fecal bile acid excretion in the rat; 2% and 4% cholestyramine.—One hundred forty male weanling rats were divided into 9 groups and placed in the diet described in Example 1. One group of 20 animals was maintained throughout the experiment as a control group and received the diet with no added taurine or cholestyramine. Two further groups serve as controls which received 0.5% or 1% of taurine in the diet and no cholestyramine. Two others received either 2% of cholestyramine or 4% of cholestyramine in the diet and no taurine. The remaining 4 groups received both taurine and cholestyramine in the diet in all combinations of the 2 dosage levels employed. The experiment had a duration of 4 weeks. During the last week feces from each group of animals were collected, dried and analyzed for bile acids by the method referred to in Example 1. The results obtained are shown in Table VI. The bile acid excretion in each instance of the use of the combination of taurine and cholestyramine is far in excess of the value obtained by adding the effects of each of these agents when administered separately.

TABLE VI.—FECAL BILE ACID EXCRETION
2% and 4% cholestyramine

| Group No. | Dietary treatment (percent) | | Fecal bile acids (micromoles/100 g. body weight/day) |
|---|---|---|---|
| | Cholestyramine | Taurine | |
| 1 | 0.0 | 0.0 | a 5.8 |
| 2 | 0.0 | 0.5 | a 6.4 |
| 3 | 0.0 | 1.0 | b 8.9 |
| 4 | 2.0 | 0.0 | c 42 |
| 5 | 2.0 | 0.5 | d e 64 |
| 6 | 2.0 | 1.0 | d o 62 |
| 7 | 4.0 | 0.0 | o d 53 |
| 8 | 4.0 | 0.5 | e 76 |
| 9 | 4.0 | 1.0 | e 82 |

NOTE.—Fecal bile acid values sharing the same superscript letter are not significantly different but all others are. Students "t" test ($P<.01$).

In Examples 1, 2, 3, and 4 the food intake by the animals of the various groups receiving diets containing resin or taurine was not altered viz à viz the control groups. The actual amounts of resin and taurine estimated to have been consumed by the animals on a milligram per kilogram of body weight per day basis in these experiments are arranged in Table VII.

Max Kleiber in "The Fire of Life," John Wiley & Sons, Inc., New York, 1961, pages 177–9 and 212–13, has described the concept of metabolic weight for comparing food and drug consumption by animals of various sizes where drug function is related to the metabolic rate of the animal. It has been shown that the body weight in kilograms raised to the three-quarter powder provides a uniform basis for comparing the metabolic activity of various warm blooded animals. Metabolic weight is defined according to this concept as body weight in $kg.^{3/4}$. The bile acid pool size and the normal daily excretion of bile acids in the feces by man and rat are similar when considered on a metabolic weight basis. Table VII also contains a calculation of the amounts of resin consumed by the animals on the various diets in Examples 1, 2, 3, and 4 on a metabolic weight basis. These values are then further related to the human doses of resin and taurine in terms of mg./kg. of body weight per day and grams per day for an 80 kg. man.

TABLE VII.—CORRESPONDENCE BETWEEN HUMAN DOSE AND RAT CONSUMPTION

| Percent in rat diet | Estimated intake 200 g. rat, mg./kg./day | Mg./kg. metabolic weight/day [1] | Corresponding dose 80 kg. man, mg./kg. day | G./day for man |
|---|---|---|---|---|
| Resin: | | | | |
| 0.07 | 57 | 38 | 13 | 1 |
| 0.56 | 450 | 300 | 100 | 8 |
| 1.00 | 805 | 537 | 179 | 14.3 |
| 1.12 | 900 | 600 | 200 | 16 |
| 1.68 | 1,350 | 900 | 300 | 24 |
| 2.0 | 1,610 | 1,072 | 358 | 28.6 |
| 4.0 | 3,220 | 2,144 | 715 | 57.2 |
| Taurine: | | | | |
| 0.035 | 28 | 19 | 6 | 0.5 |
| 0.35 | 281 | 188 | 63 | 5.0 |
| 0.50 | 402 | 268 | 89 | 7.1 |
| 1.00 | 805 | 537 | 179 | 14.3 |
| 1.04 | 837 | 558 | 186 | 14.9 |

[1] Any mammal; metabolic weight is body weight in $kg.^{3/4}$; for the 200 g. rat metabolic weight is 0.3 kg.; for an 80 kg. man metabolic weight is 26.7 kg.

Based on the foregoing data, the recommended minimum doses of resin and taurine for man are 8 g. and 7 g. per day respectively. The upper dosage limit is determined by the physiological tolerability of these materials which as a practical matter is about 57.2 g. per day for the resin and about 15 g. per day for taurine. The preferred dosage range is from about 12 g. to 16 g./day of resin and about 7 g. to 15 g./day of taurine. On a metabolic weight basis relative to body weight the dosage range is from 300 to 2144 mg./$kg.^{3/4}$/day of resin and from 268 to 558 mg./$kg.^{3/4}$/day of taurine or the molecular equivalent of a nontoxic salt thereof. On a body weight basis the foregoing dosage range for man is 100–715 mg./kg. of resin and 89–186 mg./kg. of taurine or the molecular equivalent of a non-toxic salt thereof. For the rat on a body weight basis, the dosage range upper limits are extended to 3220 mg./kg. of resin and 837 mg/kg. of taurine. The overall range then of 100–3220 mg./kg. of body weight for the resin and 80–837 mg./kg. of body weight for taurine encompasses the operable range generically for mammals.

What is claimed is:

1. The intestinal bile acid binding process which comprises administering orally to an animal in need thereof and which secretes taurine conjugated bile acids a daily dose of from 100 to 3220 mg./kg. of body weight of said animal of cholestyramine and a daily dose of from 89 to 837 mg./kg. of body weight of said animal of taurine or a molecularly equivalent amount of a pharmaceutically acceptable salt of taurine.

2. The process of claim 1 wherein taurine is employed.

3. The process of claim 1 wherein sodium taurinate is substituted in molecularly equivalent amount for taurine.

4. The process of claim 1 wherein said animal is man and a daily dose of cholestyramine within the range of 100–715 mg./kg. of body weight and a daily dose of taurine within the range of 89–186 mg./kg. of body weight is employed.

5. The process of claim 4 wherein a daily dose of cholestyramine of from 8 to 57.2 g. and a daily dose of taurine of from 7 to 15 g. is employed.

6. The process of claim 4 wherein a daily dose of cholestyramine of from 12 to 16 g. and a daily dose of taurine of from 7 to 15 g. is employed.

7. The intestinal bile acid binding process which comprises administering orally to an animal in need thereof and which secretes taurine conjugated bile acids an indigestible, non-absorable strongly basic anion exchange resin in a dose of from 100 to 3220 mg./kg. of body weight per day, and on each day of resin administration administering orally a dose of from about 89 to 837 mg./kg. of body weight of a compound selected from the group consisting of taurine, and a pharmaceutically acceptable salt thereof, said indigestible, non-absorbable strongly basic anion exchange resin being selected from the group consisting of (a) a water-insoluble, non-toxic polymeric amine having a molecular weight in excess of 3000, the property of binding at least 30% of the available glycocholic acid within 5 minutes when exposed to an aqueous solution of an equal weight of said acid, a polymeric skeleton inert to degradation by digestive enzymes, and a water content greater than 65% after equilibration with air at 100% relative humidity, and (b) cross-linked dextran chemically modified by the introduction of diethylaminoethyl anion exchange groups, having the ability to absorb only those molecules having molecular weights of less than 10,000, an absorption capacity of about 3 to 4 meq./g., the property of binding at least 30% of the available glycocholic acid within 5 minutes when exposed to an aqueous solution of an equal weight of said acid, a polymeric skeleton inert to degradation by digestive enzymes, and a molecular weight in excess of 3000.

8. The process in accordance with claim 7 wherein said anion exchange resin is a water-insoluble, non-toxic polymeric amine having a molecular weight in excess of 3000, the property of binding at least 30% of the available glycocholic acid within five minutes when exposed to an aqueous solution of an equal weight of said acid, a polymeric skeleton inert to degradation by digestive enzymes, and a water content greater than 65% after equilibration with air at 100% relative humidity.

9. The process in accordance with claim 8 wherein said anion exchange resin is an insoluble non-absorbable strong base quaternary ammonium polystyrene divinylbenzene cross-linked anion exchange resin having up to 5% cross-linking.

10. The process in accordance with claim 8 wherein said anion exchange resin is a Type I strong base quaternary ammonium polystyrene divinylbenzene cross-linked anion exchange resin having 2% cross-linking.

11. The process in accordance with claim 7 wherein taurine is employed.

12. The process in accordance with claim 7 wherein sodium taurinate is employed.

13. The process in accordance with claim 7 wherein said anion exchange resin is cross-linked dextran chemically modified by the introduction of diethylaminoethyl anion exchange groups, having the ability to absorb only those molecules having molecular weights of less than 10,000, an absorption capacity of about 3 to 4 meq./g., the property of binding at least 30% of the available glycocholic acid within 5 minutes when exposed to an aqueous solution of an equal weight of said acid, a polymeric skeleton inert to degradation by digestive enzymes, and a molecular weight in excess of 3000.

14. The process in accordance with claim 7 wherein said anion exchange resin is tetraethylene-pentamine polymer with 1-chloro-2,3-epoxypropane.

References Cited

UNITED STATES PATENTS

| | | | |
|---|---|---|---|
| 3,383,281 | 5/1968 | Wolf et al. | 424—329 X |
| 3,308,020 | 3/1967 | Wolf et al. | 424—331 X |

OTHER REFERENCES

Sjovall, Proc. Society Experimental Biology in Medicine 100 (1960), p. 676.

Chemical Abstracts, vol. 53, 22496g (1959).

Chemical Abstracts, vol. 54, 19922b (1960).

Parkinson, T. Lipid Research 8, 24–29 (1967).

J. Amer. Med. Assoc. 209, 926, August 1969.

ALBERT. T. MEYERS, Primary Examiner

N. A. DREZIN, Assistant Examiner

U.S. Cl. X.R.

424—315